US012750145B2

(12) United States Patent
Lai et al.

(10) Patent No.: US 12,750,145 B2
(45) Date of Patent: Sep. 29, 2026

(54) WIRELESS COMMUNICATION DEVICE AND ASSOCIATED INTERFERENCE DETECTION METHOD

(71) Applicant: Realtek Semiconductor Corp., HsinChu (TW)

(72) Inventors: Wei-Chi Lai, HsinChu (TW); Wei-Hsuan Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 346 days.

(21) Appl. No.: 18/592,486

(22) Filed: Feb. 29, 2024

(65) Prior Publication Data

US 2024/0313872 A1 Sep. 19, 2024

(30) Foreign Application Priority Data

Mar. 16, 2023 (TW) ................................ 112109770

(51) Int. Cl.
*H04B 17/345* (2015.01)
*H04B 7/06* (2006.01)

(52) U.S. Cl.
CPC ......... *H04B 17/345* (2015.01); *H04B 7/0626* (2013.01)

(58) Field of Classification Search
None
See application file for complete search history.

(56) References Cited

U.S. PATENT DOCUMENTS 7,623,569 B2 * 11/2009 Chang .................. H04B 17/345 375/349
10,292,104 B2 * 5/2019 Murali .................. H04L 1/0039
2005/0152480 A1 7/2005 Chang
2008/0069275 A1 * 3/2008 Horiguchi ................ H04B 7/10 375/347
2015/0236931 A1 8/2015 Merlin et al.
2022/0022183 A1 * 1/2022 Abdelghaffar ........ H04L 5/0044

FOREIGN PATENT DOCUMENTS

EP 2572467 B1 1/2015
WO 2017206781 A1 12/2017

* cited by examiner

*Primary Examiner* — Brian S Roberts
(74) *Attorney, Agent, or Firm* — Winston Hsu

(57) ABSTRACT

A wireless communication device includes a wireless transceiver circuit, a baseband signal processing circuit, and an interference detection device. The wireless transceiver circuit receives a wireless signal from a wireless transmission channel, and converts the wireless signal into a baseband signal. The baseband signal processing circuit processes the baseband signal including a plurality of packets. The interference detection device is coupled to the baseband signal processing circuit, and performs a short-term interference detection and a long-term interference detection according to the plurality of packets, to determine whether interference exists in the wireless transmission channel and generate a detection result, wherein the short-term interference detection is an interference detection within a single packet, and the long-term interference detection is an interference detection across packets. When the detection result indicates interference exists in the wireless transmission channel, the detection result further indicates a frequency band in which the interference exists.

19 Claims, 5 Drawing Sheets

WIRELESS COMMUNICATION DEVICE AND ASSOCIATED INTERFERENCE DETECTION METHOD

BACKGROUND OF THE INVENTION

1. Field of the Invention

The present invention is related to an interference detection method applied to a wireless communication device, and more particularly, to an interference detection method that can effectively detect whether interference exists in a wireless transmission channel to thereby cause the wireless communication device to perform transmission parameter adjustment according to a detection result, in order to effectively reduce transmission errors caused by the interference.

2. Description of the Prior Art

In a wireless communication system, there are many ways to prevent or reduce interference, such as carrier sense multiple access (CSMA) and collision avoidance (CA). Collision or interference cannot be completely prevented, however, which will impact transmission. More particularly, in free channels such as 2 GHz/5 GHz/6 GHz operated by Wireless Fidelity (WiFi), many different communication systems share limited bandwidth at the same time but cannot easily detect each other, making collision and interference more likely to occur. In order to reduce the impact thereof, it is an important issue to effectively detect whether there is interference in a wireless transmission channel.

SUMMARY OF THE INVENTION

It is therefore one of the objectives of the present invention to provide a wireless communication device and an associated interference detection method to address the above-mentioned issues.

According to an embodiment of the present invention, a wireless communication device is provided. The wireless communication device comprises a wireless transceiver circuit, a baseband signal processing circuit, and an interference detection device. The wireless transceiver circuit is arranged to receive a wireless signal from a wireless transmission channel, and convert the wireless signal into a baseband signal. The baseband signal processing circuit is arranged to process the baseband signal, wherein the baseband signal comprises a plurality of packets. The interference detection device is coupled to the baseband signal processing circuit, and is arranged to perform a short-term interference detection and a long-term interference detection according to the plurality of packets, for determining whether interference exists in the wireless transmission channel and generate a detection result, wherein the short-term interference detection is an interference detection within a single packet, and the long-term interference detection is an interference detection across packets. When the detection result indicates that interference exists in the wireless transmission channel, the detection result further indicates a frequency band in which the interference exists.

According to an embodiment of the present invention, an interference detection method is provided. The interference detection method comprises receiving a wireless signal from a wireless transmission channel, converting the wireless signal into a baseband signal, and processing the baseband signal, wherein the baseband signal comprises a plurality of packets; and performing a short-term interference detection according to the plurality of packets, for determining whether an interference exists in the wireless transmission channel and generating a detection result, wherein the short-term interference detection is an interference detection of a single packet; wherein in response to the detection result indicating the interference exists in the wireless transmission channel, the detection result further indicates a frequency band in which the interference exists.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
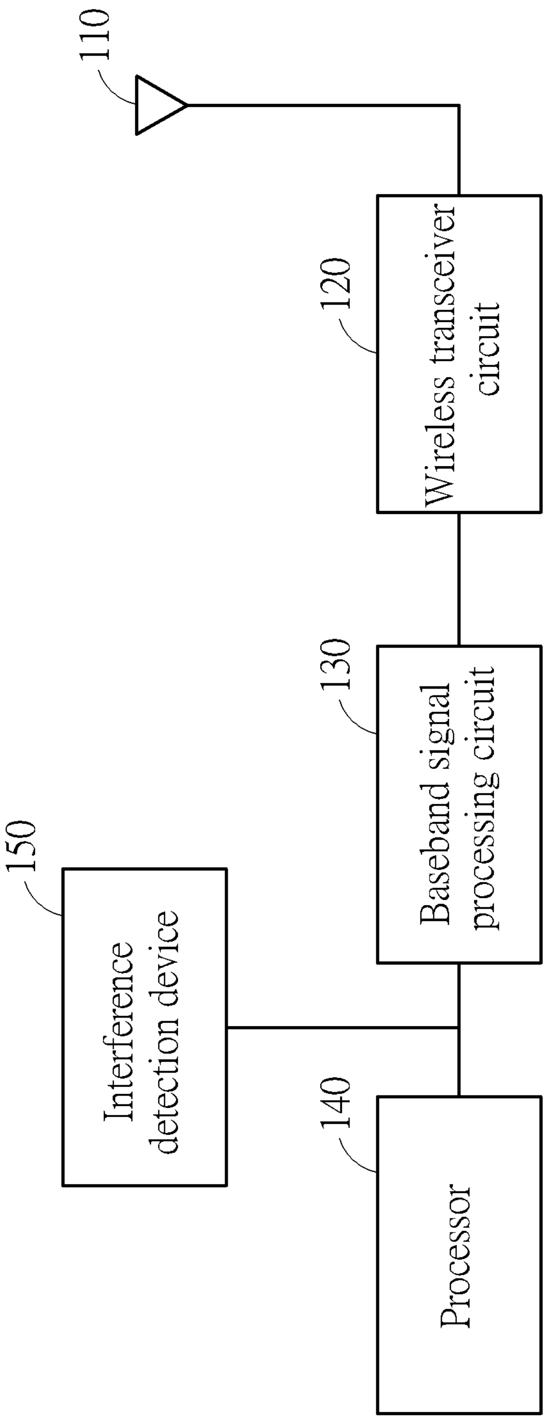
FIG. 1 is a block diagram of a wireless communication device according to an embodiment of the present invention.

FIG. 1 is a block diagram of a wireless communication device 100 according to an embodiment of the present invention. The wireless communication device 100 includes at least one antenna 110, a wireless transceiver circuit 120, a baseband signal processing circuit 130, a processor 140, and an interference detection device 150. It should be noted that FIG. 1 is a simplified wireless communication device and only illustrates components related to the present invention. In practice, a communication wireless device may further include components that are not shown in FIG. 1 to implement wireless communication and associated signal processing.

The wireless transceiver circuit 120 may be arranged to receive a wireless signal (e.g., a radio frequency signal) from a wireless transmission channel through the at least one antenna 110, and process the wireless signal to obtain a transmitted packet. Alternatively, the wireless transceiver circuit 120 may process the packet to be transmitted to obtain a corresponding signal as the wireless signal, and transmit the wireless signal through the at least one antenna 110. For example, the wireless transceiver circuit 120 may perform power amplification or power attenuation upon the signal, as well as up-frequency or down-frequency conversion, in order to convert the baseband signal into the wireless signal or convert the received wireless signal into the baseband signal.

The baseband signal processing circuit 130 may be arranged to process the baseband signal. Specifically, the baseband signal processing circuit 130 may convert data to be transmitted into a transmitted packet according to a corresponding communication protocol, or convert the received packet into data that can be processed by a back-end circuit according to the corresponding communication protocol.

The processor 140 may be arranged to control operations of the wireless communication device 100. The processor 140 may include a plurality of sub-circuits/functional modules implemented by any one of or a combination of hardware, firmware, or software to perform required signal processing functions. For example, the processor 140 include may parameter adaptation a transmission module, a channel evaluation sub-circuit/functional sub-circuit/functional module, a signal quality evaluation sub-circuit/functional module, and a packet parsing circuit/functional module.

The interference detection device 150 may be coupled to the baseband signal processing circuit 130, and may be arranged to receive the baseband signal from the baseband signal processing circuit 130 and perform interference detection according to the baseband signal, for determining whether interference exists in the wireless transmission channel and determining a frequency band in which the interference exists.

The interference detection device 150 may be an independent device, or may be integrated into the baseband signal processing circuit 130 or the processor 140 (regarded as an interference detection sub-circuit/functional module). Through the collaborative operations of the devices, the circuits and the modules, when it is determined that interference exists in the wireless transmission channel, the processor 140 may adjust transmission behavior of the wireless communication device 100 and/or adaptively adjust transmission parameters according to a detection result, in order to improve transmission correctness and transmission performance.

The wireless communication device 100 may support a plurality of IEEE 802.11 standards, wherein the IEEE 802.11 standards may include, but are not limited to: IEEE 802.11a, 802.11g, 802.11n, 802.11ac, 802.11ax, or other advanced versions. For example, the wireless communication device 100 may be an access point (AP) or a station supporting the IEEE 802.11 standards, such as a cell phone, a smart watch, a tablet, or a laptop computer.

The received wireless signal may include a plurality of packets transmitted continuously or discontinuously. After the wireless signal is converted from a radio frequency signal to a baseband signal, and the baseband signal processing circuit 130 processes the baseband signal to identify the plurality of packets, the interference detection device 150 may perform at least one of a short-term interference detection and a long-term interference detection according to the plurality of packets, for determining whether interference exists in the wireless transmission channel and correspondingly generating a detection result, wherein the short-term interference detection is an interference detection within a single packet, and the long-term interference detection is an interference detection across packets. The interference detection channel circuit 150 may utilize state information (CSI) corresponding to different orthogonal frequency division multiplexing (OFDM) symbols or different parts in the same packet to perform the interference detection within the single packet. The interference detection circuit 150 may utilize the CSI corresponding to the same or different OFDM symbols within different packets to perform the interference detection across the packets. It should be noted that the target of performing the short-term interference detection is not limited to the same packet. In some embodiments, the interference detection circuit 150 may utilize CSI corresponding to different OFDM symbols within a relatively short time slot to perform the short-term interference detection. The interference detection circuit 150 may utilize CSI corresponding to the same or different OFDM symbols within a relatively long time slot to perform the long-term interference detection. A period of a time slot may cover one or more packets.

Figure 2:
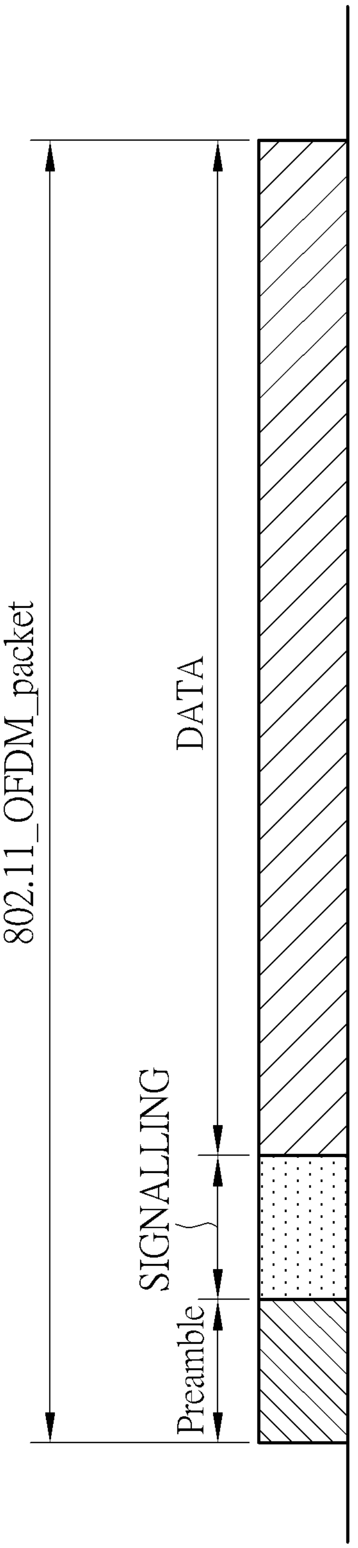
FIG. 2 is a diagram illustrating a structure of an orthogonal frequency division multiplexing (OFDM) signal frame.

FIG. 2 is a diagram illustrating a structure of an OFDM signal frame (e.g., an OFDM packet of the IEEE 802.11 standard labeled "802.11_OFDM_packet" in FIG. 2). An OFDM burst may include one or more continuous transmitted packets, and each of the one or more continuous transmitted packets may include at least one signal frame.

An OFDM packet of the IEEE 802.11 standard may include three fields (or parts), including a preamble part (labeled "Preamble" in FIG. 2), a signaling part (labeled "SIGNALLING" in FIG. 2), and a data part (labeled "DATA" in FIG. 2). Each of the three parts may be composed of one or more OFDM symbols including a short-training symbol, a long-training symbol, a signaling symbol, and a data symbol, wherein the short-training symbol and the long-training symbol are transmitted in the preamble part as a preamble signal of the packet. The preamble signal may be used for packet detection, channel detection, frequency offset detection, and device synchronization. The signaling part may include one or more signaling symbols for carrying communication parameters. The data part may include multiple data symbols for carrying user data.

Figure 3:
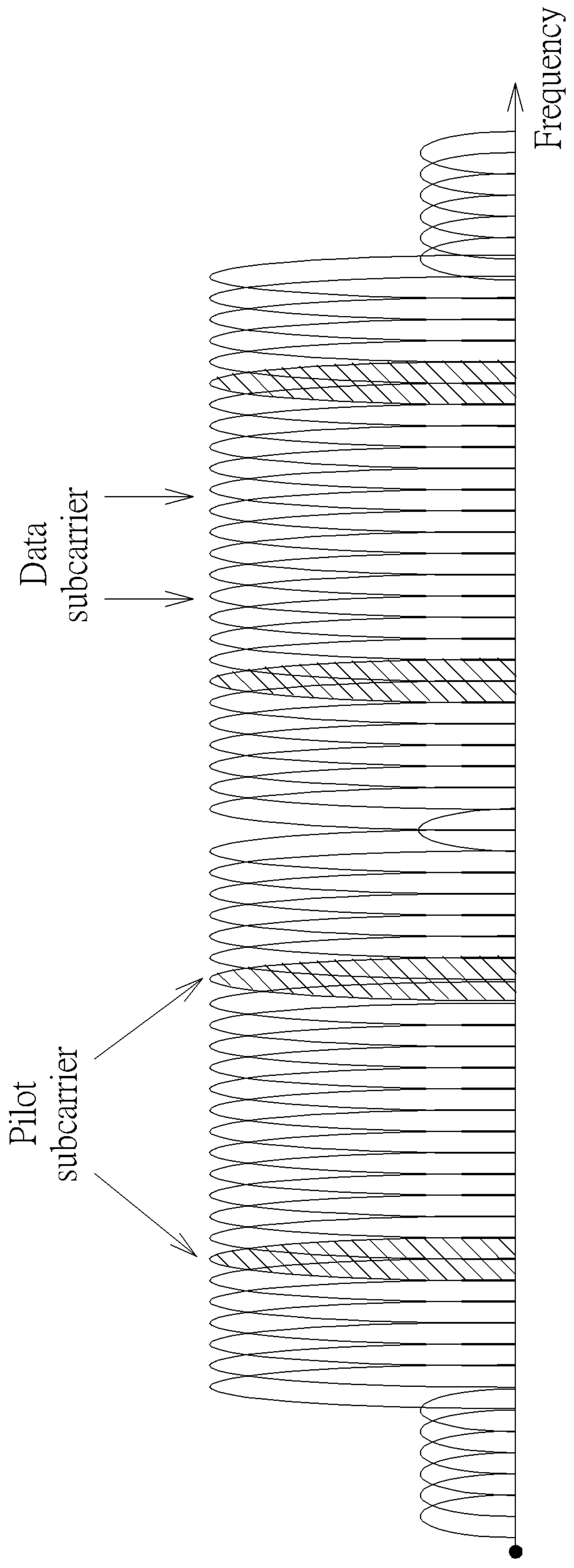
FIG. 3 is a diagram illustrating an OFDM subcarrier in a frequency domain.

In the IEEE 802.11 standard, multiple subcarriers in a frequency domain may be utilized to transmit an OFDM symbol. For example, 52 or 64 subcarriers are utilized to carry the preamble symbol, the signaling symbol, and the data symbol. For the data symbol, the multiple subcarriers may be utilized to carry both the user data and a pilot signal, wherein pilot data will be transmitted as the pilot signal for tracking a carrier frequency offset. FIG. 3 is a diagram illustrating an OFDM subcarrier in a frequency domain. As shown in FIG. 3, four subcarriers are pilot subcarriers carrying the pilot signal, and the remaining subcarriers are data subcarriers carrying the user data.

Since the wireless transmission channel is a time-varying system, amplitude component and phase component of the channel response will change with time. For the same subcarrier, the channel response estimated at adjacent or close time points typically do not change drastically. Therefore, the wireless communication device 100 can utilize this characteristic of the wireless transmission channel to perform interference detection including performing at least one of the short-term interference detection long-term interference detection, for determining whether interference exists in the wireless transmission channel. The wireless communication device 100 may perform transmission parameter adjustment according to the detection result for effectively reducing transmission errors caused by the interference and improving e transmission performance.

Figure 4:
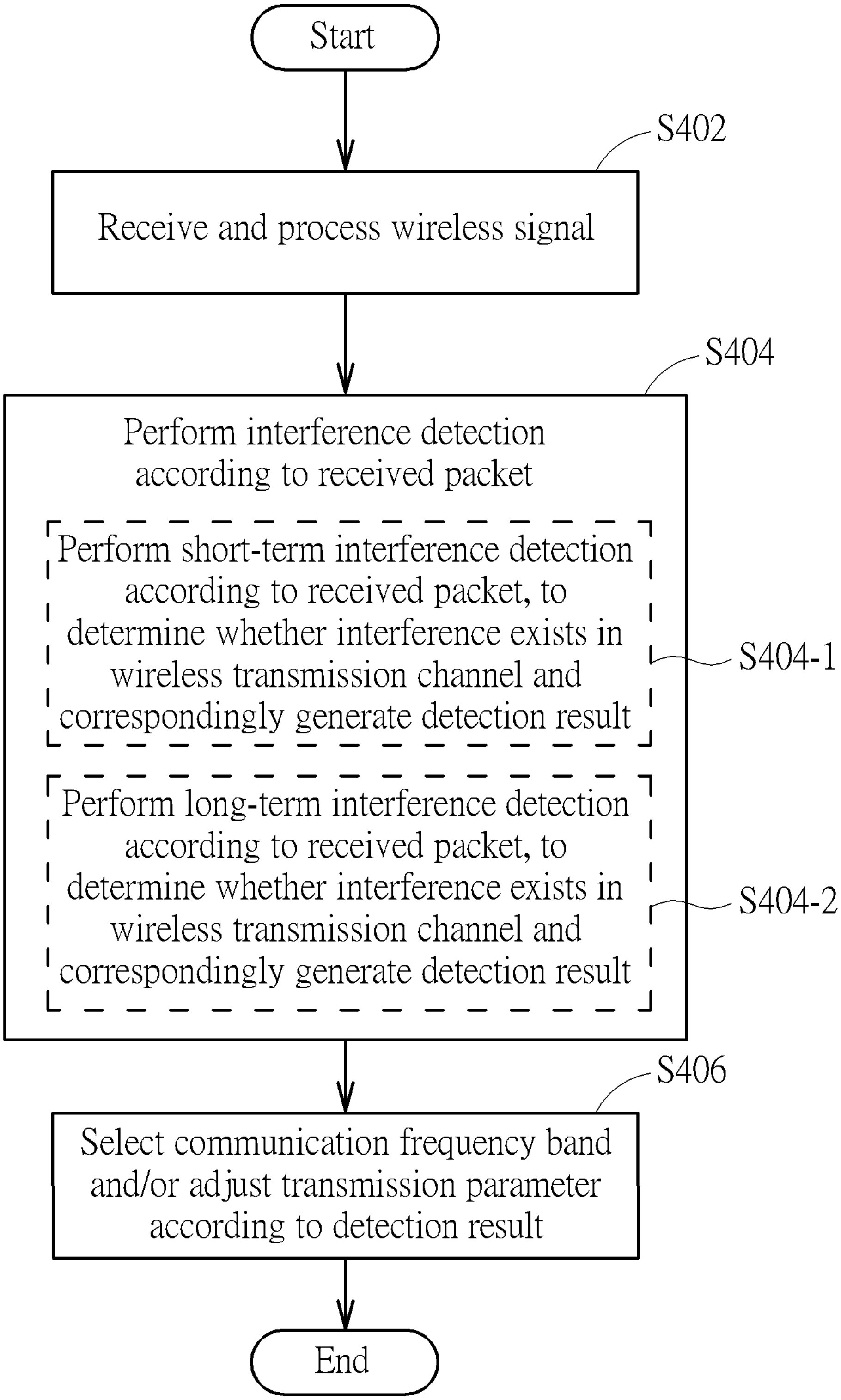
FIG. 4 is a diagram illustrating a flow chart of an interference detection method according to an embodiment of the present invention.

FIG. 4 is a diagram illustrating a flow chart of an interference detection method according to an embodiment of the present invention, wherein the interference detection method may be performed by the wireless communication device 100, and the wireless communication device 100 may be implemented as either of an AP and a station.

In Step S402, a wireless signal is received and processed, wherein the wireless transceiver circuit 120 of the wireless communication device 100 may receive the wireless signal from a wireless transmission channel through the at least one antenna 110, and the wireless transceiver circuit 120 may convert the wireless signal into a baseband signal. The baseband signal is processed by the baseband signal processing circuit 130, wherein the baseband signal may include a plurality of packets transmitted continuously or discontinuously.

In Step S404, an interference detection is performed according to the received packets to determine whether interference exists in the wireless transmission channel and correspondingly generate a detection result. In addition, Step S404 may further include two sub-steps S404-1 and S404-2, and the interference detection device 150 (in some embodiments, the baseband signal processing circuit 130 or the processor 140) may perform at least one of sub-steps S404-1 and S404-2.

In sub-step S404-1, a short-term interference detection is performed according to the received packets, for determining whether interference exists in the wireless transmission channel and correspondingly generating the detection result.

In sub-step S404-2, a long-term interference detection is performed according to the received packets, for determining whether interference exists in the wireless transmission channel and correspondingly generating the detection result.

In Step S406, a communication frequency band is selected and/or a transmission parameter is adjusted according to the detection result.

When the detection result indicates interference exists in the wireless transmission channel, the detection result further indicates a frequency band in which the interference exists. As a result, in Step S406, the wireless communication device 100 may select a communication frequency band that is far away from the frequency band in which the interference exists. In addition, the adjusted transmission parameter may be selected from a group, where the group includes at least one of a contention window length, activation of a transmission mechanism of a requesting transmission/allowing transmission, activation of a retransmission mechanism, usage of a transmission opportunity, and a time length of the transmission opportunity.

Figure 5:
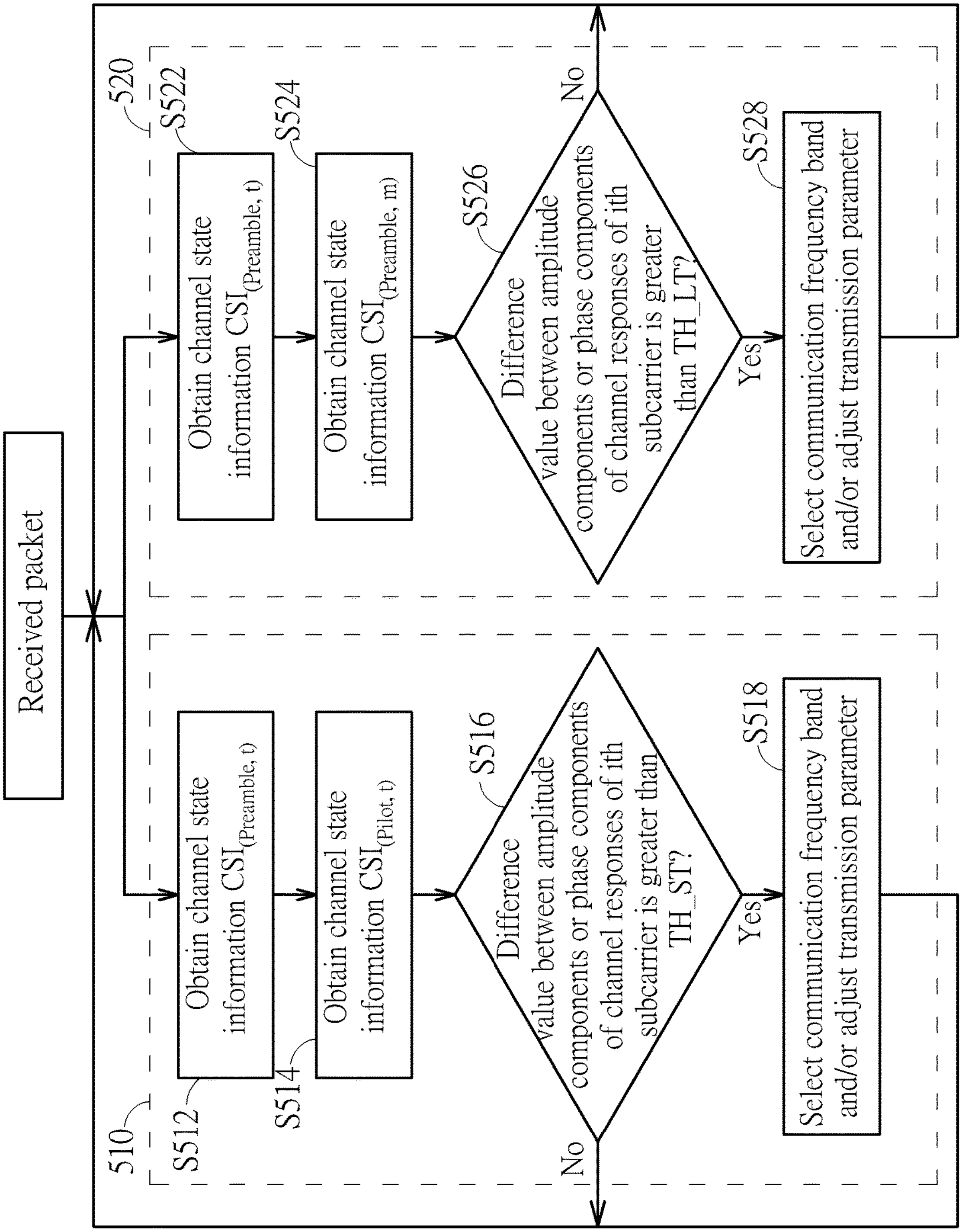
FIG. 5 is a diagram illustrating a flow chart of interference detection according to an embodiment of the present invention.

FIG. 5 is a diagram illustrating a flow chart of interference detection according to an embodiment of the present invention. Each of the received packets may include at least one signal frame. The short-term interference may detection determine whether interference exists in the wireless transmission channel based on a difference between channel responses estimated by the preamble signals and the pilot signals within the same packet. The long-term interference detection may determine whether interference exists in the wireless transmission channel based on a difference between channel responses estimated by specific signals (e.g., the preamble signals or the pilot signals) within one or more packets within different packets or different time slots, wherein the different time slots may be completely non-overlapping time slots or partially overlapping time slots, and a period of a time slot may cover a time length of one or more OFDM packets.

It should be noted that the present invention is not limited to perform the short-term interference detection according to different signal components within the same packet. In some embodiments, the short-term interference detection may be performed according to different signal components with the same time slot. A period of a time slot may cover one or more OFDM packets. The interference detection device 150 may perform a predetermined operation upon channel responses estimated by utilizing preamble signals within the same time slot to obtain an operation result acting as corresponding channel responses of all transmitted preamble signals within the time slot, and/or perform a predetermined operation upon channel responses estimated by utilizing pilot signals within the same time slot to obtain an operation result acting as corresponding channel responses of all transmitted pilot signals within the time slot, for performing a subsequent comparison. Compared with the short-term interference detection, the long-term interference detection may perform a predetermined operation according to channel responses estimated by utilizing specific signals (e.g., the preamble signals or the pilot signals) within multiple time slots to obtain corresponding operation results acting as corresponding channel responses of all transmitted specific signals within the multiple time slots in order to perform a subsequent comparison.

In addition, the channel responses for the comparison should correspond to channel responses of the same subcarrier, and the channel responses may be included in CSI estimated by utilizing corresponding signals or may be regarded as the CSI.

FIG. 5 illustrates a detailed description of Step S404, and may be divided into two parts, such as a short-term interference detection 510 and a long-term interference detection 520, wherein the short-term interference detection 510 and the long-term interference detection 520 may be performed in parallel, sequentially or selectively, and may include following steps, respectively.

In Step S512, first CSI "$CSI_{(Preamble,\ t)}$" is obtained according to preamble signals of a time slot t, wherein the parameter t is an index value of the time slot, the first CSI "$CSI_{(Preamble,\ t)}$" is CSI corresponding to preamble signals of a signal frame, and the signal frame is included in a packet of the time slot t. In one embodiment, a period of a time slot may be a time length of an OFDM packet (or may cover the time length of an ODFM packet). In some embodiments, a period of a time slot may cover a time length of multiple OFDM packets.

In Step S514, second CSI "$CSI_{(pilot,\ t)}$" is obtained according to pilot signals included in a data symbol of the time slot t, wherein the second CSI "$CSI_{(pilot,\ t)}$" is CSI corresponding to pilot signals within the same packet of the time slot t.

In Step S516, it is determined whether a difference value between an amplitude component or a phase component of the $i^{th}$ subcarrier of the first CSI and that of the second CSI is greater than a threshold value TH_ST, to determine whether interference exists in a wireless transmission channel. In response to the difference value being greater than the threshold value TH_ST, it is determined that the interference exists in the wireless transmission channel, and Step S518 is performed. In response to the difference value not being greater than the threshold value TH_ST, the method returns to Step S512 for performing the short-term interference detection 510 according to a next time slot or a next received packet.

The interference detection device 150 may perform a predetermined operation upon the first CSI "$CSI_{(Preamble,\ t)}$" of the short-term interference detection 510 to obtain a first operation result corresponding to the first CSI "$CSI_{(Preamble,\ t)}$" (i.e., an operation result corresponding to the preamble signals), perform a predetermined operation upon the second CSI "$CSI_{(pilot,\ t)}$" of the short-term interference detection 510 to obtain a second operation result corresponding to the second CSI "$CSI_{(pilot,\ t)}$" (i.e., an operation result corresponding to the pilot signals), and determine whether a difference value between the first operation result and the second operation result is greater than the threshold value TH_ST. The predetermined operation may include: obtaining an amplitude of a frequency response corresponding to the $i^{th}$ subcarrier, obtaining a phase of the frequency response corresponding to the $i^{th}$ subcarrier, utilizing a sliding window to obtain amplitudes and/or phases of frequency responses of multiple packets adjacent to the current packet, and calculating its average, its maximum value, its minimum value, or its variation.

In addition, the threshold value TH_ST may be determined according to an average or a variation of the current estimated CSI. For example, the threshold value TH_ST may be a sum of an adjustment value and the average or the variation of the amplitude and/or the phase of the frequency response corresponding to the $i^{th}$ subcarrier.

In Step S518, a communication frequency band is selected and/or a transmission parameter is adjusted.

In Step S522, the first CSI "$CSI_{(Preamble,\ t)}$" is obtained according to preamble signals of one or more packets within the time slot t.

In Step S524, third CSI "$CSI_{(Preamble,\ m)}$" is obtained according to preamble signals of one or more packets within a time slot m, wherein the parameter m is an index value of the time slot, a value of m is between (t−1) and (t−k), and k is a positive integer.

In Step S526, it is determined whether a difference value between an amplitude component or a phase component of the $i^{th}$ subcarrier of the first CSI "$CSI_{(Preamble,\ t)}$" and that of the third CSI "$CSI_{(Preamble,\ m)}$" is greater than a threshold value TH_LT, to determine whether interference exists in a wireless transmission channel. In response to the difference value being greater than the threshold value TH_LT, it is determined that the interference exists in the wireless transmission channel, and Step S528 is performed. In response to the difference value not being greater than the threshold value TH_LT, the method returns to Step S522 for performing the long-term interference detection 520 according to a next time slot or a next received packet.

The interference detection device 150 may perform a predetermined operation upon the first CSI "$CSI_{(Preamble,\ t)}$" of the long-term interference detection 520 to obtain a first operation result corresponding to the first CSI "$CSI_{(Preamble,\ t)}$" (i.e., an operation result corresponding to the preamble signals of the time slot t), perform a predetermined operation upon the third CSI "$CSI_{(Preamble,\ m)}$" of the long-term interference detection 520 to obtain a second operation result corresponding to the third CSI "$CSI_{(Preamble,\ m)}$" (i.e., an operation result corresponding to the preamble signals of the time slot m), and determine whether a difference value between the first operation result and the second operation result is greater than the threshold value TH_LT. The predetermined operation may include: obtaining an amplitude of frequency response corresponding to the $i^{th}$ subcarrier, obtaining a phase of the frequency response corresponding to the $i^{th}$ subcarrier, utilizing a sliding window to obtain amplitudes and/or phases of frequency responses of multiple packets adjacent to the current packet, and calculating its average, its maximum value, its minimum value, or its variation.

In addition, the threshold value TH_LT may be determined according to an average or a variation of the current estimated CSI. For example, the threshold value TH_LT may be a sum of an adjustment value and the average or the variation of the amplitude and/or phase of the frequency response corresponding to the $i^{th}$ subcarrier.

In Step S528, a communication frequency band is selected and/or a transmission parameter is adjusted.

The purpose of determining whether a difference value between the first CSI "$CSI_{(Preamble,\ t)}$" and the third CSI "$CSI_{(Preamble,\ m)}$" is greater than the threshold value TH_LT is to determine whether the variation of the first CSI "$CSI_{(Preamble,\ t)}$" and the third CSI "$CSI_{(Preamble,\ m)}$" is consistent with the long-term variation trend. If No, it is determined that interference exists in the wireless transmission channel, but the present invention is not limited thereto. In some embodiments, a filter result of an alpha-beta filter may be utilized to determine the variation trend of the CSI. In response to an absolute value of the latest CSI (e.g., an absolute value of the amplitude/phase of the frequency response) being greater than an absolute value of a sum of an adjustment value and the output of the alpha-beta filter, it is determined that the latest CSI has exceeded the expected trend, and therefore interference exists in the wireless transmission channel.

In addition, the interference detection device 150 is not limited to perform the long-term interference detection according to the preamble signals. In some embodiments, the interference detection device may perform the long-term interference detection according to the pilot signals.

Since the interference detection is performed according to the preamble signals and/or the pilot signals carried by the $i^{th}$ subcarrier, in response to interference existing in the wireless transmission channel, a frequency band corresponding to the $i^{th}$ subcarrier may be determined as a frequency band in which the interference exists.

A known frequency position in which interference exists may be utilized to optimize the transmission efficiency. For example, in response to the detection result indicating interference exists in the wireless transmission channel, the processor 140 may correspondingly adapt/adjust the transmission parameters and/or select a frequency band far away from the frequency band in which interference exists as an actual communication frequency band.

Specifically, when the wireless communication device 100 is implemented as an AP, the processor 140 may select a frequency band far away from the frequency band in which interference exists as a designated communication frequency band, and designate a station to transmit uplink packets to the communication frequency band, wherein the selected communication frequency band may be a set of multiple subcarriers. In this way, the uplink packet transmission correctness can be effectively improved.

When the wireless communication device 100 is implemented as a station, the processor 140 may modify a measurement result corresponding to the frequency band in which interference exists from an original value to a poor value, and transmit the modified measurement result to an AP for preventing the AP from transmitting downlink packets in the frequency band in which interference exists, wherein the measurement result is indicative of an indicator of a received signal strength. In this way, the downlink packet transmission correctness can be effectively improved. For example, when a multi-user beamforming protocol is implemented, the station must report an average signal-tonoise ratio (SNR) of each stream and the difference between the SNR and an average SNR of each subcarrier as the CSI. The processor 140 may modify an actual measurement result of the SNR of a subcarrier in which interference exists from an original value to a poor value, and generate the CSI according to the modified measurement result for reporting to the AP. After obtaining the CSI, the AP may determine that the SNR of the subcarrier in which interference exists is worse than that of other subcarriers, and therefore will not utilize the subcarrier with worse SNR to transmit data to the station, but instead select a subcarrier far away from the subcarrier with worse SNR to transmit data to the station.

The above selected frequency band and the frequency band in which interference exists may be two non-overlapping frequency bands, two frequency bands with a frequency distance greater than a threshold value, or two frequency bands with an overlapping part lower than a specific ratio.

In addition, regardless of whether the wireless communication device 100 is implemented as an AP or a station, the processor 140 may adapt or adjust the transmission parameter according to the detection result. As mentioned above, the transmission parameter may be selected from a group, and the group includes at least one of a contention window length, activation of a transmission mechanism of a requesting transmission/allowing transmission, activation of a retransmission mechanism, usage of a transmission opportunity, and a time length of the transmission opportunity.

The waiting time in the IEEE 802.11 standard is a distributed coordination function frame interval (DIFS) plus a contention window generated by a random number. When the processor 140 determines that interference exists in the wireless transmission channel according to the detection result, the selection of the contention window can be adjusted. For example, a selected value range of the random number can be enlarged or narrowed to adjust the contention window length and reduce the collision probability.

The IEEE 802.11 standard defines two transmission/protection mechanisms request to send (RTS)-clear to send (CTS) and CTS2SELF, but does not specify the usage timing. The processor 140 may determine whether to enable the RTS-CTS according to the detection result. For example, when it is determined that interference exists in the wireless transmission channel, the RTS-CTS is enabled for subsequent packet transmission.

Since a broadcast/multicast packet does not have a corresponding acknowledge, the transmitting terminal cannot know whether the receiving terminal has correctly received the broadcast packet. Therefore, the processor 140 may determine whether to enable a resend mechanism according to the detection result. For example, when it is determined that interference exists in the wireless transmission channel, the processor 140 will determine to resend the broadcast packet.

The IEEE 802.11e (QOS) standard defines a transmission opportunity (TxOP) to increase the channel usage efficiency. A parameter TxOP limit represents the maximum length transmitted at one time. During the TxOP, packets will be transmitted in sequence without competing for channel usage rights. Once a collision occurs during the TxOP, it is likely to cause continuous packet collisions, thereby affecting the channel usage efficiency. As a result, the processor 140 may determine whether to utilize the TxOP and/or adjust a time length of the TxOP according to the detection result. For example, when the detection result indicates that interference exists in the wireless transmission channel, the processor 140 may determine to suspend the TxOP for subsequent transmission or shorten the time length of the TxOP.

The processor may determine whether to adjust the transmission power according to the detection result. For example, when the detection result indicates that interference exists in the wireless transmission channel, the processor 140 may increase the transmission power to improve SNR of subsequent transmitted packets and reduce transmission errors.

In summary, by performing the short-term interference detection and the long-term interference detection in parallel or in sequence (or performing at least one of them), whether interference exists in a wireless transmission channel can be effectively detected. In response to a detection result indicating that interference exists in the wireless transmission channel, a processor can adjust transmission behavior of a wireless communication device and/or adaptively adjust transmission parameters according to the detection result, in order to improve transmission correctness and transmission performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication device, comprising:

a wireless transceiver circuit, arranged to receive a wireless signal from a wireless transmission channel, and convert the wireless signal into a baseband signal;

a baseband signal processing circuit, arranged to process the baseband signal, wherein the baseband signal comprises a plurality of packets; and an interference detection device, coupled to the baseband signal processing circuit, and arranged to perform a short-term interference detection and a long-term interference detection according to the plurality of packets, to determine whether interference exists in the wireless transmission channel and generate a detection result, wherein the short-term interference detection is an interference detection within a single packet, and the long-term interference detection is an interference detection across packets;

wherein when the detection result indicates that the interference exists in the wireless transmission channel, the detection result further indicates a frequency band in which the interference exists.

2. The wireless communication device of claim 1, wherein each of the plurality of packets comprises at least one signal frame; when the short-term interference detection is performed, the interference detection device obtains first channel state information according to a preamble signal of the least one signal frame, obtains second channel state information according to a pilot signal comprised in a data symbol of the at least one signal frame, and compares the first channel state information with the second channel state information to determine whether the interference exists in the wireless transmission channel; and when the interference is determined to exist in the wireless transmission channel, a frequency band corresponding to a subcarrier that carries the pilot signal is determined as the frequency band in which the interference exists.

3. The wireless communication device of claim 2, wherein when the first channel state information is compared with the second channel state information, the interference detection device performs a predetermined operation upon the first channel state information to obtain a first operation result corresponding to the first channel state information, performs the predetermined operation upon the second channel state information to obtain a second operation result corresponding to the second channel state information, and determines whether a difference value between the first operation result and the second operation result is greater than a threshold value; and when the difference value is greater than the threshold value, the interference detection device determines that the interference exists in the wireless transmission channel.

4. The wireless communication device of claim 1, wherein the plurality of packets comprise at least one packet within a first time slot and at least one packet within a second time slot; and when the long-term interference detection is performed, the interference detection device obtains first channel state information according to the at least one packet within the first time slot, obtains second channel state information according to the at least one packet within the second time slot, and compares the first channel state information with the second channel state information to determine whether the interference exists in the wireless transmission channel.

5. The wireless communication device of claim 4, wherein when the first channel state information is compared with the second channel state information, the interference detection device performs a predetermined operation upon the first channel state information to obtain a first operation result corresponding to the first channel state information, performs the predetermined operation upon the second channel state information to obtain a second operation result corresponding to the second channel state information, and determines whether a difference value between the first operation result and the second operation result is greater than a threshold value; and when the difference value is greater than the threshold value, the interference detection device determines that the interference exists in the wireless transmission channel.

6. The wireless communication device of claim 4, wherein the interference detection device obtains the first channel state information according to a preamble signal or a pilot signal that are within the at least one packet within the first time slot, and obtains the second channel state information according to a preamble signal or a pilot signal that are within the at least one packet within the second time slot.

7. The wireless communication device of claim 1, further comprising:

a processor, coupled to the interference detection device, and arranged to receive the detection result;

wherein the processor is further arranged to select a communication frequency band according to the detection result, and when the detection result indicates that the interference exists in the wireless transmission channel, the communication frequency band and the frequency band in which the interference exists are two non-overlapping frequency bands, two frequency bands with a frequency distance greater than a threshold value, or two frequency bands with an overlapping part lower than a specific ratio.

8. The wireless communication device of claim 7, wherein when the detection result indicates that the interference exists in the wireless transmission channel, the processor is further arranged to modify a measurement result corresponding to the frequency band in which the interference exists to generate a modified measurement result, and generate a channel state information (CSI) according to the modified measurement result; and the measurement result is indicative of an indicator of a received signal strength.

9. The wireless communication device of claim 7, wherein the processor is further arranged to adjust a transmission parameter according to the detection result; and the transmission parameter is selected from a group, and the group comprises at least one of a contention window length, activation of a transmission mechanism of a requesting transmission, activation of a transmission mechanism of an allowing transmission, activation of a retransmission mechanism, usage of a transmission opportunity, and a time length of the transmission opportunity.

10. An interference detection method, comprising:

receiving a wireless signal from a wireless transmission channel, converting the wireless signal into a baseband signal, and processing the baseband signal, wherein the baseband signal comprises a plurality of packets; and performing a short-term interference detection according to the plurality of packets, to determine whether an interference exists in the wireless transmission channel and generate a detection result, wherein the short-term interference detection is an interference detection of a single packet;

wherein in response to the detection result indicating the interference exists in the wireless transmission channel, the detection result further indicates a frequency band in which the interference exists.

11. The interference detection method of claim 10, further comprising:

performing a long-term interference detection according to the plurality of packets, to determine whether the interference exists in the wireless transmission channel and generate the detection result, wherein the long-term interference detection is an interference detection across packets.

12. The interference detection method of claim 11, wherein the plurality of packets comprise at least one packet within a first time slot and at least one packet within a second time slot; and the step of performing the long-term interference detection according to the plurality of packets, to determine whether the interference exists in the wireless transmission channel and generate the detection result comprises:

obtaining first channel state information according to the at least one packet within the first time slot;

obtaining second channel state information according to the at least one packet within the second time slot; and comparing the first channel state information with the second channel state information to determine whether the interference exists in the wireless transmission channel.

13. The interference detection method of claim 12, wherein the step of comparing the first channel state information with the second channel state information to determine whether the interference exists in the wireless transmission channel comprises:

performing a predetermined operation upon the first channel state information to obtain a first operation result corresponding to the first channel state information;

performing the predetermined operation upon the second channel state information to obtain a second operation result corresponding to the second channel state information; and determining a difference value between the first operation result and the second operation result is greater than a threshold value;

wherein in response to the difference value being greater than the threshold value, the interference is determined to exist in the wireless transmission channel.

14. The interference detection method of claim 12, wherein the first channel state information is obtained according to a preamble signal or a pilot signal that are within the at least one packet within the first time slot, and the second channel state information is obtained according to a preamble signal or a pilot signal that are within the at least one packet within the second time slot.

15. The interference detection method of claim 10, wherein each of the plurality of packets comprises at least one signal frame, and the step of performing the short-term interference detection according to the plurality of packets, to determine whether the interference exists in the wireless transmission channel and generate the detection result comprises:

obtaining first channel state information according to a preamble signal of the at least one signal frame;

obtaining second channel state information according to a pilot signal comprised in a data symbol of the at least one signal frame; and comparing the first channel state information with the second channel state information to determine whether the interference exists in the wireless transmission channel;

wherein in response to the interference existing in the wireless transmission channel, a frequency band corresponding to a subcarrier that carries the pilot signal is determined as the frequency band in which the interference exists.

16. The interference detection method of claim 15, wherein the step of comparing the first channel state information with the second channel state information to determine whether the interference exists in the wireless transmission channel comprises:

performing a predetermined operation upon the first channel state information to obtain a first operation result corresponding to the first channel state information;

performing the predetermined operation upon the second channel state information to obtain a second operation result corresponding to the second channel state information; and determining whether a difference value between the first operation result and the second operation result is greater than a threshold value;

wherein in response to the difference value being greater than the threshold value, the interference is determined to exist in the wireless transmission channel.

17. The interference detection method of claim 10, further comprising:

selecting a communication frequency band according to the detection result, wherein in response to the detection result indicating that the interference exists in the wireless transmission channel, the communication frequency band and the frequency band in which the interference exists are two non-overlapping frequency bands, two frequency bands with a frequency distance greater than a threshold value, or two frequency bands with an overlapping part lower than a specific ratio.

18. The interference detection method of claim 17, wherein in response to the detection result indicating that the interference exists in the wireless transmission channel, the interference detection method further comprises:

modifying a measurement result corresponding to the frequency band in which the interference exists to generate a modified measurement result, and generating a channel state information (CSI) according to the modified measurement result, wherein the measurement result is indicative of an indicator of a received signal strength.

19. The interference detection method of claim 17, further comprising:

adjusting a transmission parameter according to the detection result, wherein the transmission parameter is selected from a group, and the group comprises at least one of a contention window length, activation of a transmission mechanism of a requesting transmission, activation of a transmission mechanism of an allowing transmission, activation of a retransmission mechanism, usage of a transmission opportunity, and a time length of the transmission opportunity.

* * * * *